(12) United States Patent
Ishii et al.

(10) Patent No.: US 7,643,547 B2
(45) Date of Patent: Jan. 5, 2010

(54) RADIO QUALITY ESTIMATION SYSTEM, BASE STATION, MOBILE STATION, AND RADIO QUALITY ESTIMATION METHOD

(75) Inventors: Hiroyuki Ishii, Yokosuka (JP); Masafumi Usuda, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 723 days.

(21) Appl. No.: 11/331,198

(22) Filed: Jan. 13, 2006

(65) Prior Publication Data
US 2006/0178113 A1  Aug. 10, 2006

(30) Foreign Application Priority Data
Jan. 14, 2005  (JP)  ............................ P2005-008456

(51) Int. Cl.
*H03H 7/30* (2006.01)
(52) U.S. Cl. ..................... 375/227; 375/346; 375/341; 375/340; 370/318; 370/335; 370/442; 370/491; 455/522
(58) Field of Classification Search ................. 375/260, 375/227, 346, 349, 340, 341; 455/522, 502, 455/561, 436; 370/318, 442, 335, 491
See application file for complete search history.

(56) References Cited

U.S. PATENT DOCUMENTS

| | | | |
|---|---|---|---|
| 5,873,028 A * | 2/1999 | Nakano et al. | 455/69 |
| 6,404,826 B1 * | 6/2002 | Schmidl et al. | 375/340 |
| 6,999,427 B1 | 2/2006 | Usuda et al. | |
| 7,050,514 B2 * | 5/2006 | Rainbolt et al. | 375/341 |
| 7,062,287 B2 * | 6/2006 | Nakamura et al. | 455/522 |
| 7,072,680 B2 * | 7/2006 | Lee et al. | 455/522 |
| 7,218,948 B2 * | 5/2007 | Laroia et al. | 455/522 |
| 7,330,446 B2 * | 2/2008 | Lee et al. | 370/318 |

FOREIGN PATENT DOCUMENTS

CN    1282156 A    1/2001

(Continued)

OTHER PUBLICATIONS

"$3^{rd}$ Generation Partnership Project; Technical Specification Group Radio Access Network; Physical Layer Aspects of UTRA High Speed Downlink Packet Access", (Release 4), 3GPP TR 25.848 V4.0.0, Mar. 2001, pp. 1-89.

(Continued)

*Primary Examiner*—Chieh M Fan
*Assistant Examiner*—Eva Y Puente
(74) *Attorney, Agent, or Firm*—Oblon, Spivak, McClelland, Maier & Neustadt, L.L.P.

(57) ABSTRACT

An object of the present invention is to provide a radio quality estimation system, a base station, a mobile station, and a radio quality estimation method whereby, regardless of influence of fading, a radio quality of a predetermined measurement period is more accurately estimated. An interference power calculator calculates an interference-signal power of each of local estimation intervals which are parts of the predetermined estimation interval. An SIR calculator calculates an SIR of the predetermined estimation interval based on the interference-signal powers calculated by the interference power calculator.

8 Claims, 4 Drawing Sheets

FOREIGN PATENT DOCUMENTS

| | | |
|---|---|---|
| EP | 1 460 777 A2 | 9/2004 |
| JP | 9-284205 | 10/1997 |
| JP | 2001-345755 | 12/2001 |
| JP | 2003-348046 | 12/2003 |
| JP | 2004-320254 | 11/2004 |
| JP | 2005-12512 | 1/2005 |
| WO | WO 99/49689 | 9/1999 |

OTHER PUBLICATIONS

"cdma2000 High Rate Packet Data Air Interface Specification"; 3rd Generation Partnership Project 2 "3GPP2", C.S0024-A, Version 1.0, Mar. 2004.

* cited by examiner

300 REFERENCE TABLE

| SIR | CQI |
|---|---|
| SIR<-3.5dB | 0 |
| -3.5dB ≦ SIR<-2.5dB | 1 |
| -2.5dB ≦ SIR<-1.5dB | 2 |
| -1.5dB ≦ SIR<-0.5dB | 3 |
| ... | ... |
| 24.5dB ≦ SIR<25.5dB | 29 |
| 25.5dB ≦ SIR | 30 |

RADIO QUALITY ESTIMATION SYSTEM, BASE STATION, MOBILE STATION, AND RADIO QUALITY ESTIMATION METHOD

BACKGROUND OF THE INVENTION

1. Field of the Invention

The present invention relates to a radio quality estimation system, a base station, a mobile station, and a radio quality estimation method for estimating a radio quality of a predetermined measurement period.

2. Description of the Related Art

In a radio communication system, since a propagation environment considerably fluctuates due to influence of fading, there have been applied thereto a transmission power control technique, an adaptive modulation and coding technique and the like. By the transmission power control technique, a transmission power is controlled pursuant to fluctuations in the propagation environment, and by the adaptive modulation and coding technique, transmission formats including a modulation scheme and a coding ratio and the like are controlled pursuant to fluctuations in the propagation environment due to fading. In techniques such as the transmission power control technique and the adaptive modulation and coding technique, it is required to estimate a radio quality in the propagation environment on the receiver side or the transmitter side, for the purpose of estimating fluctuations in a propagation environment. Here, the radio quality corresponds to a signal-to-interference ratio (SIR), a carrier-to-interference ratio (CIR), a channel quality indicator (CQI), or the like.

On the other hand, with regards to standardization of the third generation mobile communication system which is so-called the IMT-2000, a W-CDMA method has been developed by the 3GPP (Third-Generation Partnership Project) constituted of regional standardization organizations and the like, and standard specifications of cdma2000 have been developed by the 3GPP2 (Third-Generation Partnership Project 2). With the rapid popularization of the Internet in recent years, it is expected that high-speed and high-volume traffic by such causes as downloads from databases or websites will increase especially in downlinks. Therefore, in the 3GPP, standardization of the "High-speed Downlink Packet Access (HSDPA)", which is a high-speed packet transmission method for a downlink, has been conducted (for example, refer to 3GPP TR25.848 V4.0.0). Also in the 3GPP2, standardization of the "1xEV-DO," which is a transmission method dedicated for high-speed data in a downlink, has been conducted (for example, refer to 3GPP2 C.S0024 Rev.1.0.0). Note that "DO" in the 1xEV-DO means "Data Only."

For example, in the HSDPA, a mobile station uses the CQI as control information for noticing a radio condition in a downlink. The CQI is calculated by the mobile station, based on the SIR obtained by using signals of a common pilot channel (CPICH), i.e., pilot signals, in the downlink. Additionally, the SIR is used, for example, in communication methods in the 3GPP other than the HSDPA, and other communication methods such as the cdma2000 method in the 3GPP2 and a TDD method. Accordingly, in each of these communication methods, it is preferable to estimate the SIR accurately in a measurement period defined in a specification thereof as a measurement period for estimating the SIR.

SUMMARY OF THE INVENTION

However, since a radio quality considerably fluctuates due to influence of fading, it is difficult to accurately estimate the radio quality.

An object of the present invention is to provide a radio quality estimation system, a base station, a mobile station, and a radio quality estimation method for estimating a radio quality more accurately regardless of influence of fading.

A first aspect of the present invention is summarized as a radio quality estimation system for estimating a first radio quality of a predetermined estimation measurement period, the radio quality estimation system including: a second quality calculator which calculates a second radio quality of each of plural partial measurement periods which are parts of the estimation measurement period; and a first radio quality calculator which calculates the first radio quality of the estimation measurement period based on the second radio quality calculated by the second quality calculator.

According to the first aspect of the present invention, the second radio quality calculator calculates the second radio quality of the respective partial measurement periods which are more than one, and each of which is shorter than the predetermined estimation measurement period used for estimating the first radio quality. Additionally, based on the second radio quality of the respective partial measurement periods calculated by the second quality calculator, the first radio quality of the estimation measurement period is calculated. Accordingly, even in a case where the second radio quality used for calculating the first radio quality to be estimated cannot be accurately calculated due to influence of fading when they are calculated with larger estimation measurement periods, the first radio quality is more accurately estimated. That is, according to the radio quality estimation system defined by the first aspect, it becomes possible to accurately estimate a radio quality regardless of influence of fading. Note that the first radio quality and the second radio quality may be the same.

The radio quality estimation system according to the first aspect may be configured to further include: a fading frequency estimation unit which estimates a fading frequency; and a measurement period setting unit which sets the partial measurement periods based on the fading frequency which has been estimated by the frequency fading estimation unit.

In the radio quality estimation system according to the first aspect, the first radio quality estimated by the radio quality estimation system may be a signal-to-interference ratio.

The radio quality estimation system according to the first aspect may be configured to further include a third quality calculator which calculates a received-signal power indicating a power of received signals received during the estimation measurement period, and fourth quality calculator calculates the second radio quality of the estimation measurement period based on the second radio quality of the respective partial measurement periods calculated by the second quality calculator. The second radio quality may be an interference signal power indicating a power of interference signals received during the partial measurement period. The first quality calculator may calculate the signal-to-interference ratio based on the received-signal power calculated by the third quality calculator and the interference signal powers calculated respectively by the fourth quality calculators.

In the radio quality estimation system according to the first aspect, the third quality calculator may calculate the received-signal powers by using pilot signals received during the estimation measurement period, and the second quality calculator may calculate the interference signal power by using pilot signals received during the partial measurement period.

In the radio quality estimation system according to the first aspect, suppose that: N, m, and n denote integers not less than 1; an in-phase component and a quadrature-phase component of the n-th one of the pilot signals are denoted by $S_{n,j}$ and $S_{n,q}$ respectively; the first to N-th ones of the pilot signals are received during the estimation measurement period; and the $k_m$-th to $K_m$-th ones of the pilot signals are received during the m-th partial measurement period. Then, the third quality calculator may calculate the received-signal power S as follows:

$$S = \frac{1}{N} \sum_{n=1}^{N} (S_{n,j}^2 + S_{n,q}^2),$$

and the second quality calculator may calculate the interference signal power $I_m$ of the m-th partial measurement period as follows:

$$I_m = \frac{1}{(K_m - k_m)} \left( \sum_{n=k_m}^{K_m} \left( (S_{n,j} - \bar{S}_i^{(m)})^2 + (S_{n,q} - \bar{S}_q^{(m)})^2 \right) \right)$$

where $$\bar{S}_i^{(m)} = \frac{1}{(K_m - k_m + 1)} \sum_{n=k_m}^{K_m} S_{n,i}, \text{ and } \bar{S}_q^{(m)} = \frac{1}{(K_m - k_m + 1)} \sum_{n=k_m}^{K_m} S_{n,q}.$$

A second aspect of the present invention is summarized as a base station for estimating a first radio quality of a predetermined estimation measurement period, the base station including: a second quality calculator which calculates a second radio quality of each of plural partial measurement periods which are parts of the predetermined estimation measurement period; and a first quality calculator which calculates the first radio quality of the estimation measurement period based on the second radio quality calculated by the second quality calculator.

A third aspect of the present invention is summarized as a mobile station for estimating a first radio quality of a predetermined estimation measurement period, the mobile station including: a second quality calculator which calculates a second radio quality of each of plural partial measurement periods which are parts of the predetermined estimation measurement period; and a first quality calculator which calculates the first radio quality of the estimation measurement period based on the second radio quality calculated by the second quality calculator.

A fourth aspect of the present invention is summarized as a radio quality estimation method of estimating a first radio quality of a predetermined estimation measurement period, the radio quality estimation method including the steps of calculating a second radio quality of each of plural partial measurement periods which are parts of the estimation measurement period; and calculating the first radio quality of the estimation measurement period based on the second radio quality.

As described above, according to the present invention, it becomes possible to provide a radio quality estimation system, a base station, a mobile station, and a radio quality estimation method whereby a radio quality can be more accurately estimated regardless of influence of fading.

DESCRIPTION OF THE PREFERRED EMBODIMENTS (A Quality Estimation Apparatus)

Hereinafter, with reference to the drawings, an embodiment of the present invention will be described. In the following descriptions on the drawings, corresponding or similar elements are denoted by corresponding or similar reference numerals. However, it should be noted that the drawings are schematic.

Figure 1:
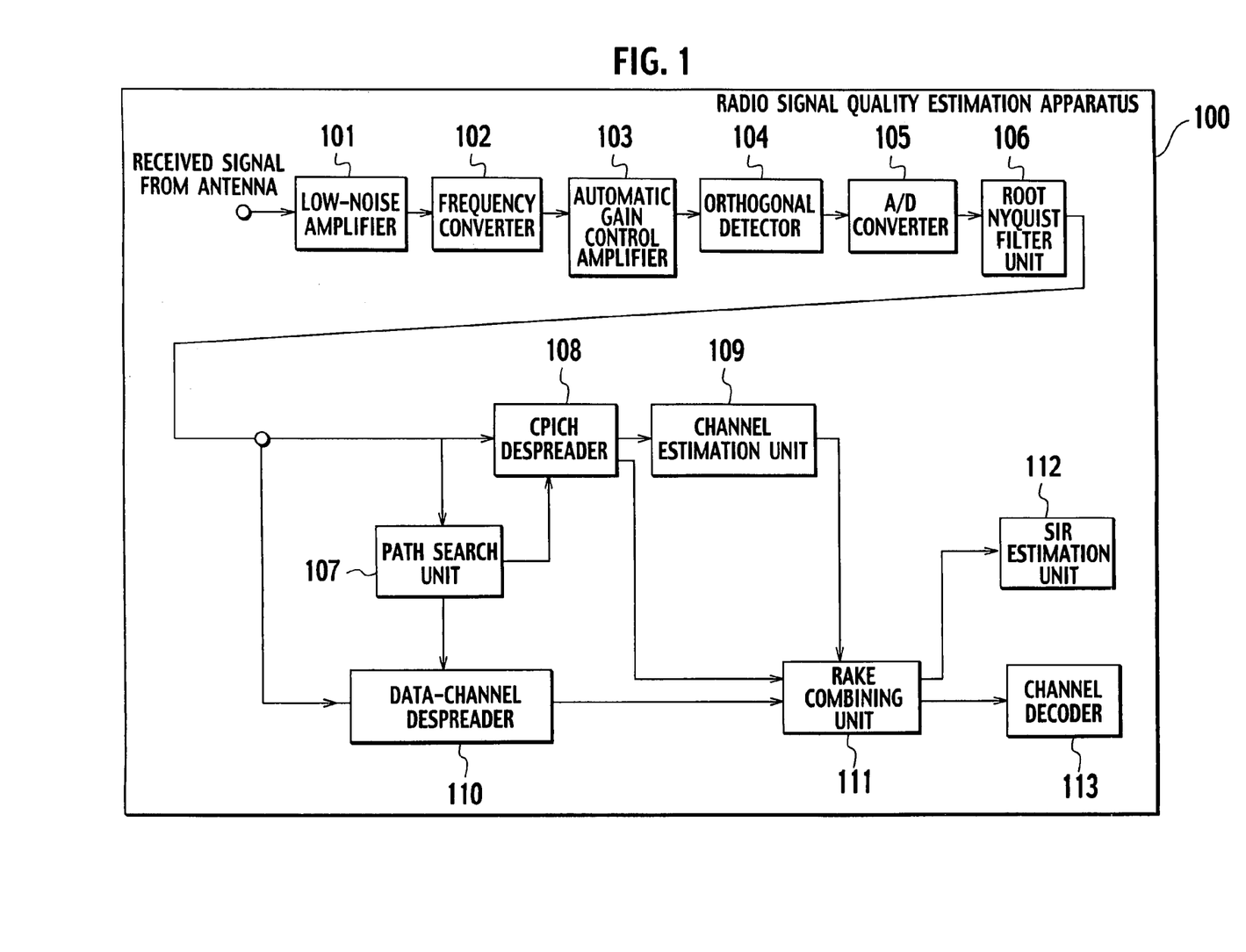
FIG. 1 is a configuration diagram of a radio quality estimation apparatus according to an embodiment of the present invention.

FIG. 1 is a diagram showing a configuration example of a radio quality estimation apparatus 100 to which a quality estimation method according to one embodiment of the present invention is applied. The radio quality estimation apparatus 100, by processing received signals received by an antenna thereof, estimates a signal-to-interference ratio, i.e., an SIR, which is one of radio quality. Additionally, the radio quality estimation apparatus 100 decodes received coded signals.

As shown in FIG. 1, the radio quality estimation apparatus 100 includes a low-noise amplifier 101, a frequency converter 102, an automatic gain control amplifier 103, an orthogonal detector 104, an A/D converter 105, a root Nyquist filter unit 106, a path search unit 107, a CPICH despreader 108, a channel estimation unit 109, a data-channel despreader 110, a unit 111, an SIR estimation unit 112, and a channel decoder 113.

The low-noise amplifier 101 amplifies received signals received by the antenna of the radio quality estimation apparatus 100. The frequency converter 102 performs frequency conversion into ones having intermediate frequencies on the received signals amplified by the low-noise amplifier 101. The automatic gain control amplifier 103 applies linear amplification to the received signals converted into ones having intermediate frequencies. The orthogonal detector 104 performs orthogonal detection on the received signal to which the linear amplification has been applied, and thereby decomposes each of the received signals into an in-phase component and a quadrature-phase component. The A/D converter 105 converts the received signals into digital signals, the received signals are analogue signals decomposed into the in-phase and quadrature-phase components. The root Nyquist filter unit 106 imposes bandwidth restrictions on the in-phase and quadrature-phase components converted into the digital signal. The path search unit 107 performs a path search by using the signals of which the bandwidth is restricted.

With respect to a CPICH which is a common pilot channel, the CPICH despreader 108 performs despread of the signals of which the bandwidth is restricted. Here, the CPICH despreader 108 performs the despread with respect to each one of groups of paths searched out by the path search unit 107, the groups being different from one another in propagation delay time. The channel estimation unit 109 performs channel estimation by using the signals despreaded by the CPICH despreader 108.

With respect to a data channel, the data-channel despreader 110 performs despread of the signals of which the bandwidth is restricted. Here, the data-channel despreader 110 performs the despread with respect to each of groups of paths searched out by the path search unit 107, the groups being different with one another in propagation delay time. Note that the data channel is, for example, a shared control channel HS-SCCH, a shared data channel HS-PDSCH, a dedicated channel A-DPCH accompanies abovementioned shared channel and the like in the HSDPA.

The RAKE combining unit 111 performs RAKE combining of the despreaded CPICH signals with respect to one path, or more than one paths different from one another in propagation delay time. The RAKE combining unit 111 inputs the combined signals into the later described SIR estimation unit 112. Additionally, the RAKE combining unit 111 performs RAKE combining of the despreaded data-channel signals with respect to one path, or more than one paths different from one another in propagation delay time. The RAKE combining unit 111 inputs the combined signals into the later described channel decoder 113.

The SIR estimation unit 112 estimates a signal-to-interference ratio SIR by using the signals acquired from the RAKE combining unit 111. Details of the SIR estimation unit 112 will be described later.

The channel decoder 113 performs channel decoding by using the signals acquired from the RAKE combining unit 111.

Figure 2:
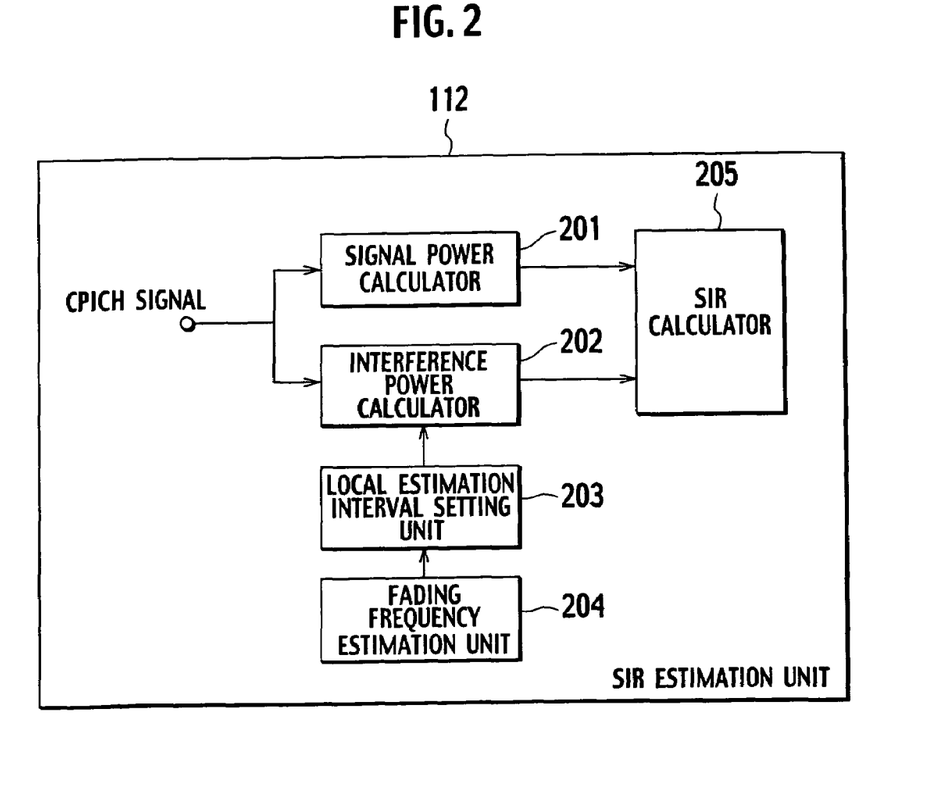
FIG. 2 is a configuration diagram of an SIR estimation unit according to the embodiment of the present invention.

Hereinafter, with reference to FIG. 2, details of the SIR estimation unit 112 will be described. The SIR estimation unit 112 estimates an SIR of a predetermined estimation interval. Note that the predetermined estimation interval corresponds to the estimation measurement period. The SIR estimation unit 112 further includes a signal power calculator 201, an interference power calculator 202, a local estimation interval setting unit 203, a fading frequency estimation unit 204, and an SIR calculator 205.

The signal power calculator 201 corresponds to a third quality calculator which calculates a received-signal power indicating a power of received signals received during the predetermined estimation interval. The signal power calculator 201 calculates the received-signal power by using the combined CPICH signals, i.e., the pilot signals, acquired from the RAKE combining unit 111. The signal power calculator 201 calculates the received-signal power by using the CPICH signals received by the radio quality estimation apparatus 100 during the predetermined estimation interval.

Specifically, the signal power calculator 201 calculates the received-signal power S in accordance with the following formula (1). Note that: n and N denote integers not less than 1; in-phase and quadrature-phase components of the n-th one of the pilot signals are denoted by $S_{n,i}$ and $S_{n,q}$ respectively; and the first to N-th ones of the pilot signals are assumed to be received during the predetermined estimation interval.

$$S = \frac{1}{N}\sum_{n=1}^{N}(S_{n,i}^2 + S_{n,q}^2) \quad (1)$$

The interference power calculator 202 corresponds to the second quality calculator which calculates the second radio quality of each of plural local estimation intervals. However, in a case where the later described local estimation interval setting unit 203 has set a single local estimation interval, the interference power calculator 202 calculates the second radio quality of one local estimation interval. Note that, in this embodiment, the second radio quality calculated by the interference power calculator 202 is an interference-signal power. Here, the local estimation intervals are parts of a predetermined estimation interval set by the local estimation interval setting unit 203, that is, the local estimation intervals correspond to the partial measurement periods. In this embodiment, the interference power calculator 202 calculates an interference-signal power indicating a power of interference signals received during each of the local estimation intervals. The interference power calculator 202 calculates the interference-signal power by using the combined CPICH signals, i.e., the pilot signals, acquired from the RAKE combining unit 111. The interference power calculator 202 calculates the interference-signal power by using the combined CPICH signals received during each of the local estimation intervals.

Specifically, the interference power calculator 202 calculates the interference signal power $I_m$ of the m-th local estimation interval in accordance with the following formula (2). Note that: m and N denote integers not less than 1; and the $k_m$-th to $K_m$-th ones of the CPICH signals are assumed to have been received during the m-th partial measurement period.

$$I_m = \frac{1}{(K_m - k_m)}\left(\sum_{n=k_m}^{K_m}\left(\left(S_{n,i} - \overline{S}_i^{(m)}\right)^2 + \left(\left(S_{n,q} - \overline{S}_q^{(m)}\right)^2\right)\right)\right) \quad (2)$$

where $$\overline{S}_i^{(m)} = \frac{1}{(K_m - k_m + 1)}\sum_{n=k_m}^{K_m}S_{n,i}, \text{ and } \overline{S}_q^{(m)} = \frac{1}{(K_m - k_m + 1)}\sum_{n=k_m}^{K_m}S_{n,q}$$

Moreover, the following formula (3) holds true in a case where the predetermined estimation interval is divided into M local estimation intervals having the same size, by the input of the local estimation interval setting unit 203.

$$K_m = k_m + \frac{N}{M} - 1 \quad (3)$$

Accordingly, in this case, the foregoing formula (2) can be replaced with the following formula (2-1):

$$I_m = \frac{1}{\left(\frac{N}{M} - 1\right)}\left(\sum_{n=k_m}^{k_m+\frac{N}{M}-1}\left(\left(S_{n,i} - \overline{S}_i^{(m)}\right)^2 + \left(S_{n,q} - \overline{S}_q^{(m)}\right)^2\right)\right) \quad (2\text{-}1)$$

where $$\overline{S}_i^{(m)} = \frac{1}{\left(\frac{N}{M}\right)}\sum_{n=k_m}^{k_m+\frac{N}{M}-1}S_{n,i} \text{ and } \overline{S}_q^{(m)} = \frac{1}{\left(\frac{N}{M}\right)}\sum_{n=k_m}^{k_m+\frac{N}{M}-1}S_{n,q}.$$

Furthermore, the interference power calculator 202 also operates as a fourth quality calculator which calculates an interference-signal power I of the predetermined estimation interval based on the interference signal powers $I_m$ of the respective local estimation intervals. Specifically, the interference power calculator 202 calculates the interference-signal power I in accordance with the following formula (4).

$$I = \frac{1}{M}\sum_{m=1}^{M} I_m \quad (4)$$

The local estimation interval setting unit 203 is the measurement period setting unit which sets the local estimation interval based on a fading frequency estimated by the later described fading frequency estimation unit 204. Note that the fading frequency implies a speed at which the fading fluctuates.

The local estimation interval setting unit 203 determines whether it does or does not divide the predetermined measurement period into plural ones of the local estimation intervals. For example, the local estimation interval setting unit 203 can determine a larger number of the local estimation intervals with a larger estimated value of the fading frequency. On that occasion, the local estimation interval setting unit 203 may determine a number of the local estimation intervals based on a comparison result obtained by comparing an estimated value of the fading frequency with a threshold value. Moreover, the local estimation interval setting unit 203 may set a number of the local estimation intervals in consideration of a size of the predetermined estimation interval. Note that the local estimation interval setting unit 203 may set plural ones of the local estimation intervals different from one another in size.

The fading frequency estimation unit 204 estimates the fading frequency, and inputs an estimated value into the local estimation interval setting unit 203. Here, as methods of estimating the fading frequency, for example, there have been known a method using time correlation values of pilot signals, a method using time correlation values of channel estimation values obtained based on pilot signals, and a method using a moving speed calculated based on positional information from the GPS. The fading frequency estimation unit 204 may estimate the fading frequency by any one of these methods. Furthermore, the fading frequency estimation unit 204 may estimate the fading frequency by using a moving speed measured by another apparatus for measuring a moving speed, the another apparatus being a speedometer of an automobile, or the like.

The SIR calculator 205 corresponds to the first quality calculator which calculates an SIR of the predetermined estimation interval based on the interference-signal power calculated by the interference power calculator 202. The SIR calculator 205 calculates the SIR based on the received-signal power calculated by the signal power calculator 201 and on the interference-signal power of the predetermined estimation interval, the interference-signal power having been calculated by the interference power calculator 202. Note that the interference-signal power of the predetermined estimation interval is calculated based on the interference-signal powers of the respective local estimation intervals. Accordingly, the SIR calculator 205 calculates the SIR based on the interference-signal powers of the respective local estimation intervals, the interference-signal powers having been calculated by the interference power calculator 202.

Specifically, the SIR calculator 205 acquires the received-signal power S, and the interference-signal power I of the predetermined estimation interval, respectively, from the signal power calculator 201, and from the interference power calculator 202. By using the acquired received-signal power S and interference-signal power I, the SIR calculator 205 calculates the SIR in accordance with the following formula (5).

$$SIR = \frac{S}{I} \quad (5)$$

Figure 3:
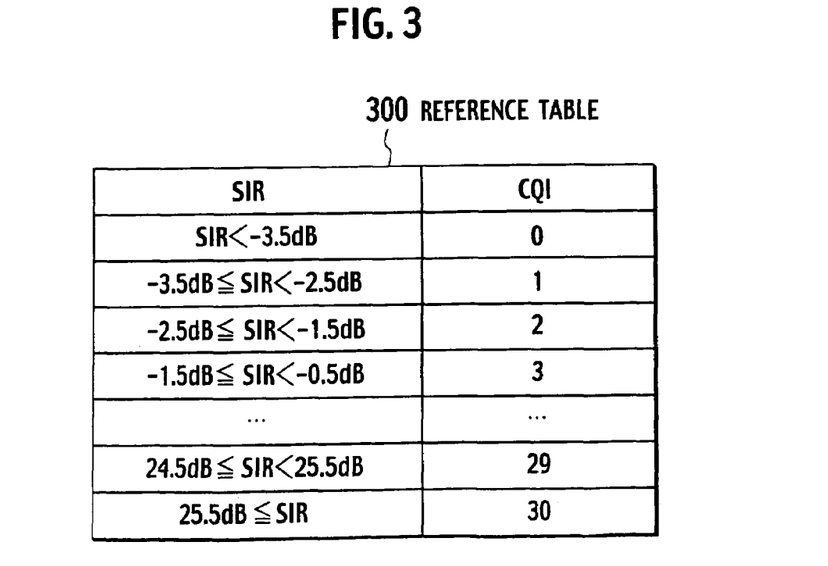
FIG. 3 is an illustration showing a reference table according to the embodiment of the present invention.

Furthermore, the SIR calculator 205 may calculate a CQI by using the calculated SIR. For example, the SIR calculator 205 may calculate the CQI by containing a reference table 300 shown in FIG. 3 and referring the reference table 300. Note that, in the HSDPA, the CQI is calculated in order that, an error ratio can be 10% when a signal of a transmission format derived from the CQI is received.

As described above, the radio quality estimation apparatus 100 operates by itself as a radio quality estimation system for estimating radio quality of a predetermined estimation interval. Likewise, the SIR estimation unit 112 can also operate by itself as a radio quality estimation system for estimating radio quality of a predetermined estimation interval.

(A Quality Estimation Method)

Figure 4:
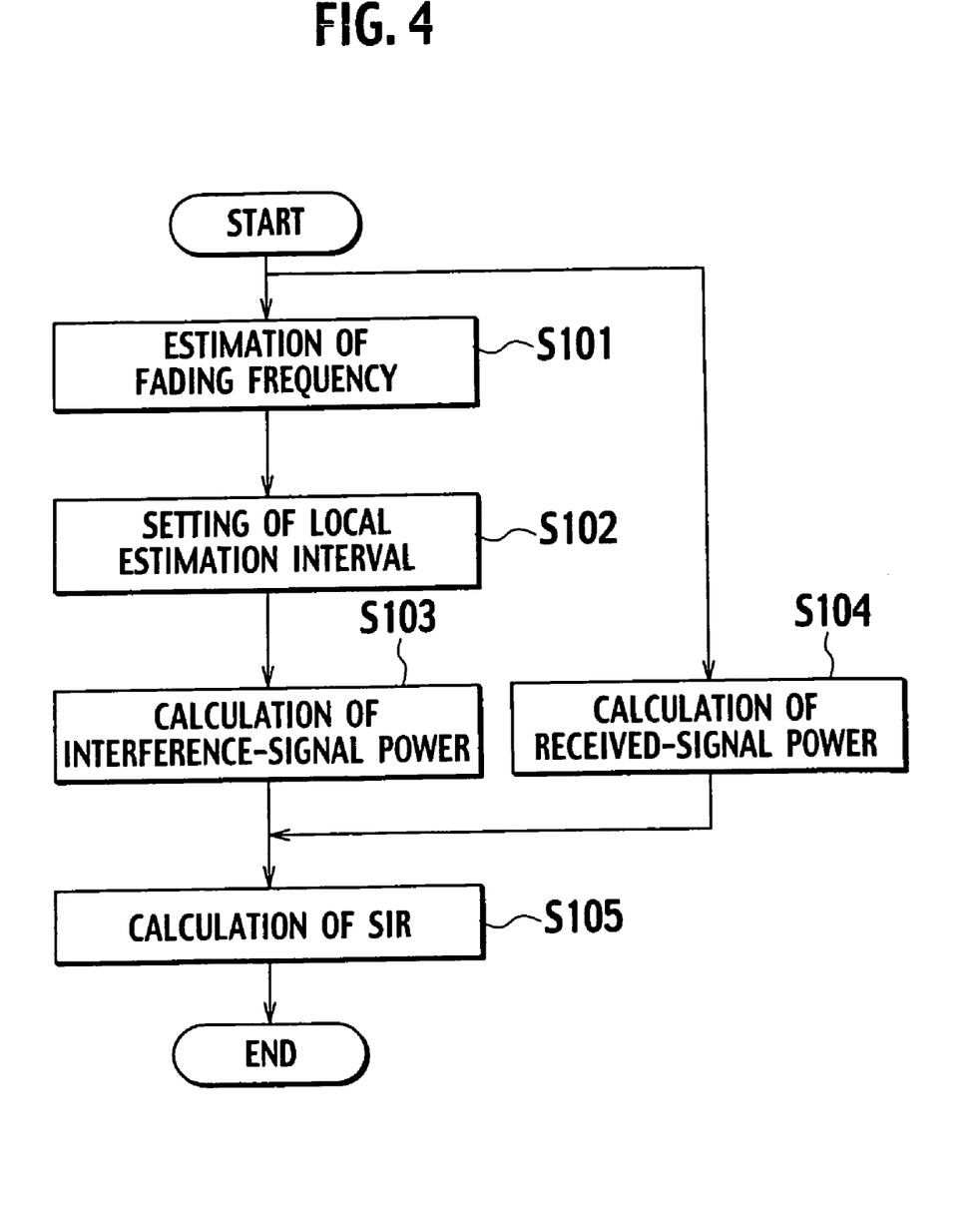
FIG. 4 is a flowchart of a radio quality estimation method according to the embodiment of the present invention.

Hereinafter, a quality estimation method will be described by using FIG. 4. Here, as one example, a method will be described whereby the radio quality estimation apparatus 100 estimates an SIR of a predetermined estimation interval of 2 ms by using 30 CPICH signals numbered as the 1st to 30th signals.

In Step S101, the fading frequency estimation unit 204 estimates a fading frequency.

In Step S102, based on the estimated fading frequency, the local estimation interval setting unit 203 sets a local estimation interval used for estimating a power of an interference component.

For example, by comparing the estimated fading frequency with a threshold value 100 Hz, the local estimation interval setting unit 203 sets three local estimation intervals of the same size if the phasing frequency is not less than 100 Hz, and sets a single local estimation interval if it is less than 100 Hz.

In Step S103, the interference power calculator 202 calculates an interference-signal power of a local estimation interval.

For example, suppose that three local estimation intervals of the same size are set. In this case, the size of the respective local estimation intervals is 0.67 ms, and a number of CPICH signals received during each of the local estimation intervals is 10. Accordingly, N and M in formula (2-1) become 30 and 3, respectively. Therefore, the interference-signal powers of the respective local estimation intervals are calculated in accordance with the following formulae (2-1)'.

$$I_1 = \frac{1}{(10-1)}\left(\sum_{n=1}^{10}\left((S_{n,i} - \overline{S}_i^{(1)})^2 + (S_{n,q} - \overline{S}_q^{(1)})^2\right)\right), \quad (2\text{-}1)$$

$$I_2 = \frac{1}{(10-1)}\left(\sum_{n=11}^{20}\left((S_{n,i} - \overline{S}_i^{(2)})^2 + (S_{n,q} - \overline{S}_q^{(2)})^2\right)\right), \text{ and}$$

$$I_3 = \frac{1}{(10-1)}\left(\sum_{n=21}^{30}\left((S_{n,i} - \overline{S}_i^{(3)})^2 + (S_{n,q} - \overline{S}_q^{(3)})^2\right)\right)$$

where $$\overline{S}_i^{(1)} = \frac{1}{10}\sum_{n=1}^{10} S_{n,i}, \quad \overline{S}_q^{(1)} = \frac{1}{10}\sum_{n=1}^{10} S_{n,q},$$

-continued $$\overline{S}_i^{(2)} = \frac{1}{10}\sum_{n=11}^{20} S_{n,i}, \quad \overline{S}_q^{(2)} = \frac{1}{10}\sum_{n=11}^{20} S_{n,q},$$

$$\overline{S}_i^{(3)} = \frac{1}{10}\sum_{n=21}^{30} S_{n,i}, \text{ and } \overline{S}_q^{(3)} = \frac{1}{10}\sum_{n=21}^{30} S_{n,q},$$

Additionally, the interference-signal power of the predetermined estimation interval is calculated in accordance with the following formula (3)'.

$$I = \frac{1}{3}\sum_{m=1}^{3} I_m, \tag{3}$$

In Step S104, the signal power calculator 201 calculates the received-signal power.

Note that, since N in formula (1) is 30, the received-signal power is calculated in accordance with the following formula (1)'.

$$S = \frac{1}{30}\sum_{n=1}^{30}(S_{n,i}^2 + S_{n,q}^2) \tag{1}'$$

In Step S105, the SIR calculator 205 calculates the SIR.

(Effect)

Figure 5:
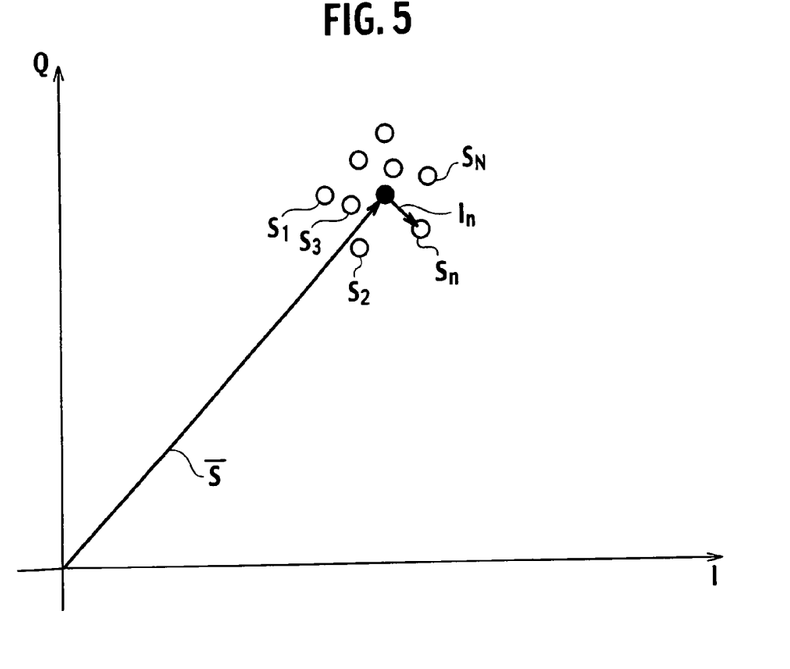
FIG. 5 is a chart explaining a method of calculating an SIR.

In general, an SIR is calculated by using pilot signals. For example, in a case where an SIR is estimated based on N pilot signals $S_1, S_2, \ldots, S_N$, depicted at FIG. 5, the received-signal power S is calculated in accordance with the following formula (6) by assuming that in-phase and quadrature-phase components of the n-th one of the pilot signals are denoted by $S_{n,i}$ and $S_{n,q}$ respectively.

$$S = \frac{1}{N}\sum_{n=1}^{N}(S_{n,i}^2 + S_{n,q}^2) \tag{6}$$

Additionally, the interference-signal power I is calculated in accordance with the following formula (7).

$$I = \frac{1}{(N-1)}\left(\sum_{n=1}^{N}\left((S_{n,i} - \overline{S}_i)^2 + (S_{n,q} - \overline{S}_q)^2\right)\right) \tag{7}$$

Here, $\overline{S}_i$ and $\overline{S}_q$ are arithmetic means of the in-phase components and of the quadrature-phase components, respectively, of the pilot signals, and they are calculated in accordance with the following formulae (8).

$$\overline{S}_i = \frac{1}{N}\sum_{n=1}^{N} S_{n,i} \text{ and } \overline{S}_q = \frac{1}{N}\sum_{n=1}^{N} S_{n,q}. \tag{8}$$

In other words, the interference-signal power I is found as a variance of pilot signal powers. Note that, as shown in FIG. 5, $\overline{S}$ denotes an arithmetic mean of the pilot signal powers, and that $I_n$ denotes a variance of signal powers of the n-th pilot signal having a signal power $S_n$.

In other words, the interference-signal power I is found as a variance of pilot signal powers. Note that $\overline{S}$ denotes an arithmetic mean of the pilot signal powers, and that $I_n$ denotes a variance of signal powers of the n-th pilot signal having a signal power $S_n$.

Figure 6:
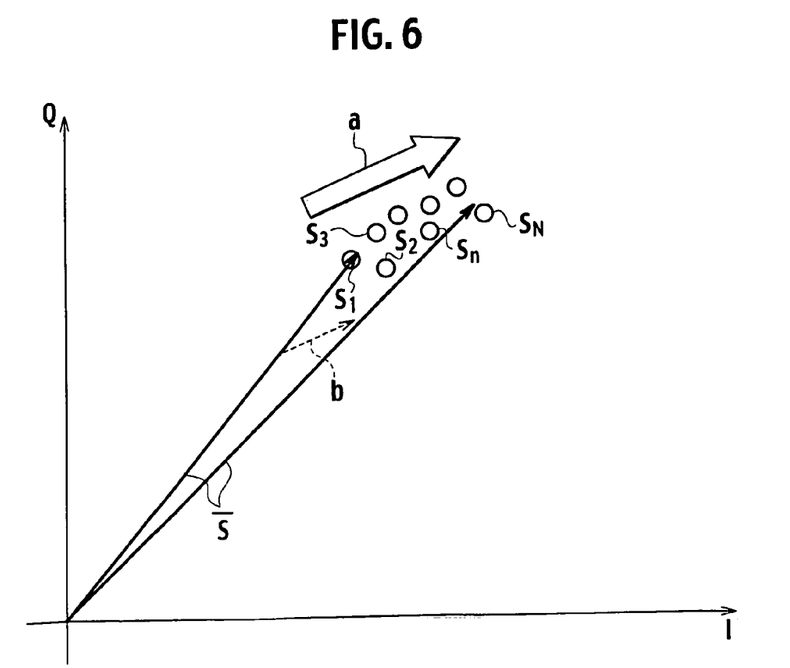
FIG. 6 is a chart explaining influence of fading in calculating the SIR.

However, in a case where N as a number of the pilot signals is large and where fluctuations in a propagation environment due to fading fluctuations are rapid, the above arithmetic mean of the pilot signal powers widely fluctuates during the predetermined estimation interval used for estimating the SIR, i.e., during a measurement period when the N pilot signals are received. Schematically shown in FIG. 6 is a manner in which the arithmetic mean of the pilot signal powers widely fluctuates during the predetermined estimation interval used for estimating the SIR. In FIG. 6, pilot signals widely fluctuate in a direction indicated by "a,". Accordingly, the arithmetic mean of the pilot signal powers fluctuates in a direction indicated by "b."

For example, a case will be discussed where the SIR of the predetermined estimation interval of 2 ms is calculated by using 30 pilot signals. In this case, assuming that a fading frequency in a propagation environment is 200 Hz, one cycle of fluctuation is 5 ms and the propagation environment widely fluctuates even during a 2-ms period corresponding to the predetermined estimation interval. Accordingly, the interference power calculated in accordance with formula (7) by using the arithmetic means calculated by using the 30 pilot signals in accordance with formulae (8) turns out to be inaccurate. Therefore, the SIR cannot be accurately calculated.

According to the radio quality estimation apparatus 100 of this embodiment, the interference power calculator 202 calculates an interference-signal power of each of plural local estimation intervals shorter than the predetermined estimation interval used for estimating the SIR. Also, based on the interference-signal powers in the respective local estimation intervals calculated by the interference power calculator 202, the SIR of the predetermined estimation interval is calculated. Accordingly, even in a case where, due to influence of fading, interference-signal powers used in calculation of the SIR as a subject of the estimation cannot be accurately calculated in a larger estimation interval, the SIR can be more accurately estimated. In other words, even with influence of fading, it becomes possible to more accurately estimate the SIR. Note that, for example, a measurement period, for which an SIR used in calculating a CQI in the HSDPA is estimated, is defined to be 2 ms (corresponding to 30 CPICH signals) by a specification. Likewise, a measurement period for which an SIR is estimated is defined in other communication methods and other standard specifications, whereby it is difficult to alter a size of a predetermined estimation interval for which the SIR is calculated.

Furthermore, since the SIR calculator 205 calculates the CQI by using the estimated SIR, the CQI can be more accurately estimated even in a case where influence of fading causes a propagation environment to fluctuate at a high speed. Note that the CQI is used in, for example, an adaptive modulation and coding process in the HDSPA.

Additionally, the local estimation interval setting unit 203 sets a local estimation interval based on a fading frequency estimated by the fading frequency estimation unit 204. Thereby, an appropriate local estimation interval is set in accordance with a magnitude of the fading frequency. Thus, when the fading frequency is large, by calculating interference-signal powers respectively in a large number of local estimation intervals, it becomes possible to accurately calculate the SIR. On the other hand, when the fading frequency is small, by calculating interference-signal powers respectively in a small number of the local estimation intervals, it becomes possible to suppress a load imposed by calculations on the radio quality estimation apparatus 100. Furthermore, when the fading frequency is small, by setting a small number of the local estimation intervals, for example, setting the only one local estimation interval, it becomes possible to calculate the interference-signal power more accurately than setting a large number of local estimation intervals.

Additionally, in this embodiment, the radio quality estimation apparatus 100 can estimate SIRs more accurately, which are used in a large number of communication methods including the HSDPA, the communication methods other than the HSDPA in the 3GPP, the cdma2000 method in the 3GPP2, the TDD method, and the like.

Other Embodiments

Although the present invention has been described by way of the abovementioned embodiment, it should not be understood that descriptions and drawings constituting a part of this disclosure limit this invention. From this disclosure, various alternative embodiments, examples and operational techniques will be obvious to those skilled persons in the art.

For example, although it has been described in the abovementioned embodiment that the signal power calculator 201, the interference power calculator 202, the local estimation interval setting unit 203, the fading frequency estimation unit 204, and the SIR calculator 205 are included in the one radio quality estimation apparatus 100, they may be separately included in a plurality of apparatuses. In that case, it is premised that, in order to allow data exchanges among the plurality of apparatuses, the apparatuses are connected to one another by a bus or the like.

Furthermore, the respective component portions included in the SIR estimation unit 112 may be included in the mobile station.

Moreover, although the radio quality in a downlink has been described in the abovementioned embodiment, a radio quality in an uplink is estimated likewise. In this case, the respective component portions included in the SIR estimation unit 112 may be included in the base station.

Furthermore, the SIR estimation unit 112 may not necessarily include the fading frequency estimation unit 204. In this case, the local estimation interval setting unit 203 sets a local estimation interval without taking a fading frequency into consideration. The local estimation interval setting unit 203 sets the local estimation interval, for example, on a fixed basis.

Additionally, although an example where the local estimation interval setting unit 203 sets 3 local estimation intervals is shown in the above described example, the local estimation interval setting unit 203 may set any number, which is for example 5, of local estimation intervals. Otherwise, the local estimation interval setting unit 203 may compare the fading frequency with, for example, two threshold values, and may set the 1, 3 or 5 local estimation intervals based on a comparison result.

Furthermore, although the SIR estimation unit 112 estimates the SIR by using signals to which the RAKE combining by the RAKE combining unit 111 has been already applied, in the abovementioned embodiment, it may estimate the SIR by using a signal to which the RAKE combining by the RAKE combining unit 111 has not yet been applied.

Additionally, although the signal power calculator 201 is configured to calculate the received-signal power of the predetermined estimation interval in the abovementioned embodiment, it may calculate a received-signal power of each of the local estimation intervals set by the local estimation interval setting unit 203. Then, the SIR calculator 205 may calculate an SIR of each of the local estimation intervals, by using the received-signal power and the interference-signal power of the respective local estimation intervals. Furthermore, the SIR calculator 205 may calculate an SIR of the predetermined estimation interval based on the SIRs of the respective local estimation intervals. In this case, the SIR calculator 205 operates as the second quality calculator which calculates the second radio quality of each of the plurality local estimation intervals, and simultaneously, operates as the first quality calculator which calculates the first radio quality of the predetermined estimation interval based on the second radio quality calculated by the second quality calculator. Note that both the first and second quality figures in this case are SIRs.

Additionally, although the interference power calculator 202 is configured to calculate an interference-signal power by a general method of obtaining an arithmetic mean in the abovementioned embodiment, it may calculate the interference-signal power by a method using a forgetting coefficient. A method of calculating the interference-signal power by a method using a forgetting coefficient is indicated as follows.

Suppose that: N, m, and j denote integers not less than 1; an in-phase component and a quadrature-phase component of the n-th one of the CPICH signals are denoted by $S_{n,i}$ and $S_{n,q}$ respectively; the 1st to N-th ones of the CPICH signals are received during the predetermined estimation interval; and the $k_m$-th to $K_m$-th ones of the CPICH signals are received during the m-th local estimation interval. Then, an interference-signal power $\hat{n}(j)$ of the j-th one of the CPICH signals is calculated in accordance with the following formulae (9):

$$\hat{n}(j) = \left(1 - \frac{N-1}{N}\right) \cdot \hat{n}_{tmp}(j) + \frac{N-1}{N} \cdot \hat{n}(j-1), \text{ and} \qquad (9)$$

$$\hat{n}_{tmp} = \frac{K_m - k_m + 1}{K_m - k_m}\left(\left(S_{j,i} - \overline{S}_i^{(m)}\right)^2 + \left(S_{j,q} - \overline{S}_q^{(m)}\right)^2\right)$$

where $$\left(\overline{S}_i^{(m)}, \overline{S}_q^{(m)}\right) = \left(\frac{1}{(K_m - k_m + 1)}\sum_{j=k_m}^{E_m} S_{j,i}, \frac{1}{(K_m - k_m + 1)}\sum_{j=k_m}^{K_m} S_{j,q}\right), \text{ for}$$

$$(j = k_m, k_m + 1, \ldots, K_m).$$

An interference-signal power of the N-th one of the CPICH signals becomes the interference-signal power of the predetermined estimation interval.

What is claimed is:
1. A radio quality estimation system for estimating a first radio quality of a predetermined estimation measurement period, comprising:
   a second quality calculator configured to calculate a second radio quality of each of plural partial measurement periods which are parts of the estimation measurement period;
   a first quality calculator configured to calculate the first radio quality of the estimation measurement period based on the second radio quality calculated by the second quality calculator;

a fading frequency estimation unit configured to estimate a fading frequency; and a measurement period setting unit configured to set the partial measurement periods based on the fading frequency estimated by the fading frequency estimation unit.

2. The radio quality estimation system according to claim 1, wherein, the first radio quality estimated by the radio quality estimation system is a signal-to-interference ratio.

3. The radio quality estimation system according to claim 2, further comprising:

a third quality calculator configured to calculate a received-signal power indicating a power of received signals received during the estimation measurement period;

a fourth quality calculator configured to calculate the second radio quality of the estimation measurement period based on the second radio quality of the respective partial measurement periods calculated by the second quality calculator, wherein the second radio quality is an interference-signal power indicating a power of interference signals, and the first quality calculator calculates the signal-to-interference ratio based on the received-signal power calculated by the third quality calculator and the interference signal power calculated by the fourth quality calculator.

4. The radio quality estimation system according to claim 3, wherein, the third quality calculator calculates the received-signal power by using pilot signals received during the estimation measurement period, and the second quality calculator calculates the interference signal power by using pilot signals received during each of the partial measurement periods.

5. The radio quality estimation system according to claim 4, wherein, the third quality calculator calculates the received-signal power S as $$S = \frac{1}{N} \sum_{n=1}^{N} (S_{n,j}^2 + S_{n,q}^2)$$

by assuming that N, m, and n denote integers not less than 1, that an in-phase component and a quadrature-phase component of the n-th one of the pilot signals are denoted by $S_{n,i}$ and $S_{n,q}$ respectively, that the first to N-th ones of the pilot signals are received during the estimation measurement periods, and that the $k_m$-th to $K_m$-th ones of the pilot signals are received during the m-th partial measurement period, and the second quality calculator calculates the interference signal power $I_m$ of the m-th partial measurement period as $$I_m = \frac{1}{(K_m - k_m)} \left( \sum_{n=k_m}^{K_m} \left( (S_{n,j} - \bar{S}_i^{(m)})^2 + (S_{n,q} - \bar{S}_q^{(m)})^2 \right) \right)$$

-continued where $$\bar{S}_i^{(m)} = \frac{1}{(K_m - k_m + 1)} \sum_{n=k_m}^{K_m} S_{n,i},$$

and $$\bar{S}_q^{(m)} = \frac{1}{(K_m - k_m + 1)} \sum_{n=k_m}^{K_m} S_{n,q}.$$

6. A base station for estimating a first radio quality of a predetermined estimation measurement period, comprising:

a second quality calculator configured to calculate a second radio quality of each of plural partial measurement periods which are parts of the estimation measurement period;

a first quality calculator configured to calculate the first radio quality of the estimation measurement period based on the second radio quality calculated by the second quality calculator;

a fading frequency estimation unit configured to estimate a fading frequency; and a measurement period setting unit configured to set the partial measurement periods based on the fading frequency estimated by the fading frequency estimation unit.

7. A mobile station for estimating a first radio quality of a predetermined estimation measurement period, comprising:

a second quality calculator configured to calculate a second radio quality of each of plural partial measurement periods which are parts of the predetermined estimation measurement period;

a first quality calculator configured to calculate the first radio quality of the predetermined estimation measurement period based on the second radio quality calculated by the second quality calculator;

a fading frequency estimation unit configured to estimate a fading frequency; and a measurement period setting unit configured to set the partial measurement periods based on the fading frequency estimated by the fading frequency estimation unit.

8. A radio quality estimation method, in a radio quality estimation system, of estimating a first radio quality of a predetermined estimation measurement period, comprising the steps of:

calculating, in the radio quality estimation system of a radio communications system, a second radio quality of each of plural partial measurement periods which are parts of the predetermined estimation measurement period;

calculating the first radio quality of the estimation measurement period based on the second radio quality;

estimating a fading frequency; and setting the partial measurement periods based on the estimated fading frequency.

* * * * *